(12) United States Patent
Wang et al.

(10) Patent No.: US 7,125,493 B2
(45) Date of Patent: *Oct. 24, 2006

(54) HIGHLY ASYMMETRIC, HYDROPHILIC, MICROFILTRATION MEMBRANES HAVING LARGE PORE DIAMETERS

(75) Inventors: I-Fan Wang, San Diego, CA (US); Richard A. Morris, Encinitas, CA (US); Robert F. Zepf, Solana Beach, CA (US)

(73) Assignee: Pall Corporation, East Hills, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/918,871

(22) Filed: Aug. 16, 2004

(65) Prior Publication Data

US 2005/0011834 A1     Jan. 20, 2005

Related U.S. Application Data

(60) Continuation of application No. 10/427,752, filed on Apr. 29, 2003, now Pat. No. 6,939,468, which is a continuation of application No. 09/415,320, filed on Oct. 8, 1999, now Pat. No. 6,565,782, which is a division of application No. 08/764,321, filed on Dec. 12, 1996, now Pat. No. 6,045,899.

(51) Int. Cl.
    *B01D 11/00*     (2006.01)
(52) U.S. Cl. ............ 210/645; 210/321.75; 210/321.84; 436/178; 436/177; 436/170; 422/60; 422/101
(58) Field of Classification Search ................ 210/645, 210/500.22, 321.75, 500.41, 500.42, 321.84, 210/489, 500.24; 264/49; 422/101, 56, 422/60; 436/177–178, 170
See application file for complete search history.

(56) References Cited

U.S. PATENT DOCUMENTS

| | | |
|---|---|---|
| 3,567,810 A | 3/1971 | Baker |
| 3,855,122 A | 12/1974 | Bourganel |
| 4,026,977 A | 5/1977 | Bourganel |
| 4,207,182 A | 6/1980 | Marze |
| 4,250,029 A | 2/1981 | Kiser et al. |

(Continued)

FOREIGN PATENT DOCUMENTS

DE         40 00 825 A1     5/1990

(Continued)

OTHER PUBLICATIONS

U.S. Appl. No. 09/865,886, filed May 25, 2001, Wang et al.

(Continued)

*Primary Examiner*—Ana Fortuna

(57) ABSTRACT

The present invention relates to the field of synthetic polymeric microfiltration membrane materials that are fabricated to separate liquids from solids contained therein. One aspect of the invention relates to a highly asymmetric, hydrophilic microfiltration membrane with high surface porosity. The membrane is rendered hydrophilic through co-casting the sulfone polymer with a hydrophilic polymer, such as polyvinylpyrrolidone. The membranes of the invention are highly useful in testing devices for the quick detection of properties or components contained in liquid samples, such as diagnostic applications, as well as for other filtration applications that demand relatively large pore sizes, thick membranes, high asymmetry, and/or high lateral wicking speeds.

24 Claims, 6 Drawing Sheets

U.S. PATENT DOCUMENTS

| | | | |
|---|---|---|---|
| 4,413,074 A | | 11/1983 | Wrasidlo et al. |
| 4,432,875 A | | 2/1984 | Wrasidlo et al. |
| 4,451,424 A | | 5/1984 | Tweddle et al. |
| 4,481,260 A | | 11/1984 | Nohmi |
| 4,551,482 A | | 11/1985 | Tschang et al. |
| 4,629,563 A | | 12/1986 | Wrasidlo |
| 4,720,343 A | | 1/1988 | Walch et al. |
| 4,774,039 A | | 9/1988 | Wrasidlo |
| 4,798,847 A | | 1/1989 | Roesink et al. |
| 4,818,387 A | | 4/1989 | Ikeda et al. |
| 4,824,870 A | | 4/1989 | Pemawansa et al. |
| 4,840,733 A | | 6/1989 | Sasaki et al. |
| 4,851,121 A | | 7/1989 | Yokota et al. |
| 4,900,449 A | | 2/1990 | Kraus et al. |
| 4,902,422 A | | 2/1990 | Pinnau et al. |
| 4,920,193 A | | 4/1990 | Hann et al. |
| 4,933,081 A | | 6/1990 | Sasaki et al. |
| 4,964,990 A | | 10/1990 | Kraus et al. |
| 4,987,085 A | * | 1/1991 | Allen et al. ............... 436/169 |
| 5,006,287 A | | 4/1991 | Davis |
| 5,076,935 A | | 12/1991 | Kraus et al. |
| 5,108,607 A | | 4/1992 | Kraus et al. |
| 5,171,445 A | | 12/1992 | Zepf |
| 5,188,734 A | | 2/1993 | Zepf |
| 5,232,597 A | | 8/1993 | Eguchi |
| 5,240,862 A | * | 8/1993 | Koenhen et al. ........... 436/178 |
| 5,246,582 A | | 9/1993 | Sluma et al. |
| 5,264,180 A | * | 11/1993 | Allen et al. .................. 422/56 |
| 5,269,931 A | | 12/1993 | Hu et al. |
| 5,306,623 A | | 4/1994 | Kiser et al. |
| 5,340,480 A | | 8/1994 | Kawata et al. |
| 5,418,142 A | | 5/1995 | Kiser et al. |
| 5,444,097 A | | 8/1995 | Tkacik |
| 5,531,893 A | | 7/1996 | Hu et al. |
| 5,834,107 A | | 11/1998 | Wang et al. |
| 5,846,422 A | | 12/1998 | Ditter et al. |
| 5,869,174 A | | 2/1999 | Wang |
| 5,885,456 A | | 3/1999 | Charkoudian et al. |
| 5,886,059 A | | 3/1999 | Wang |
| 5,906,742 A | | 5/1999 | Wang et al. |
| 5,928,774 A | | 7/1999 | Wang et al. |
| 5,958,989 A | | 9/1999 | Wang et al. |
| 5,979,670 A | | 11/1999 | Ditter et al. |
| 6,045,694 A | * | 4/2000 | Wang et al. ............ 210/500.37 |
| 6,045,899 A | | 4/2000 | Wang et al. |
| 6,110,309 A | | 8/2000 | Wang et al. |
| 6,110,369 A | | 8/2000 | Ditter et al. |
| 6,146,747 A | | 11/2000 | Wang et al. |
| 6,183,640 B1 | | 2/2001 | Wang |
| 6,258,272 B1 | | 7/2001 | Wang et al. |
| 6,277,281 B1 | | 8/2001 | Ditter et al. |
| 6,355,081 B1 | | 3/2002 | Wang et al. |
| 6,440,306 B1 | | 8/2002 | Ditter et al. |
| 6,521,012 B1 | | 2/2003 | Lamon et al. |
| 6,565,748 B1 | | 5/2003 | Wang et al. |
| 6,565,782 B1 | | 5/2003 | Wang et al. |
| 6,579,342 B1 | | 6/2003 | Wang et al. |
| 6,596,112 B1 | | 7/2003 | Ditter et al. |
| 6,884,375 B1 | | 4/2005 | Wang et al. |
| 2002/0139095 A1 | | 10/2002 | Wang et al. |
| 2002/0148774 A1 | | 10/2002 | Wang et al. |
| 2002/0162792 A1 | | 11/2002 | Zepf et al. |
| 2003/0038081 A1 | | 2/2003 | Wang et al. |
| 2003/0192826 A1 | | 10/2003 | Wang et al. |
| 2004/0054125 A1 | | 3/2004 | Schindler et al. |
| 2004/0065607 A1 | | 4/2004 | Wang et al. |

FOREIGN PATENT DOCUMENTS

| | | |
|---|---|---|
| EP | 0 145 305 A2 | 6/1985 |
| EP | 0 568 045 A1 | 11/1993 |
| GB | 2 155 356 A | 9/1985 |
| GB | 2 199 786 A | 7/1988 |
| GB | 2 293 133 B | 3/1996 |
| WO | WO 96/40421 | 12/1996 |

OTHER PUBLICATIONS

U.S. Appl. No. 09/003,893, filed Jul. 5, 1995, Wrasidlo.
Kestling, "Synthetic Polymer Membranes: A Structural Perspective", p. 275 (John Wiley & Sons, 2d edition (1985)).
Supplementary European Search Report Application No. EP 97 95 2327.
U.S. Appl. No. 08/206,114, filed Mar. 4, 1994 to Ditter, et al.
U.S. Appl. No. 08/473,536, filed Jun. 7, 1995 to Ditter, et al. (see U.S. Appl. No. 08/206,114).
U.S. Appl. No. 08/476,189, filed Jun. 7, 1995 to Ditter, et al. (see U.S. Appl. No. 08/206,114).
U.S. Appl. No. 08/498,722, filed Jul. 5, 1995 to Wang, et al. (see Patent No. 5,906,742).
U.S. Appl. No. 09/563,143, filed May 2, 2000 to Schindler, et al.
U.S. Appl. No. 09/616,666, filed Jul. 14, 2000 to Wang, et al.
U.S. Appl. No. 09/694,106, filed Oct. 20, 2000 to Wang, et al.
U.S. Appl. No. 09/865,886, filed May 25, 2001 to Wang, et al. (see Patent No. 5,906,742).
U.S. Appl. No. 10/603,425, filed Jun. 24, 2003 to Ditter, et al.

* cited by examiner

HIGHLY ASYMMETRIC, HYDROPHILIC, MICROFILTRATION MEMBRANES HAVING LARGE PORE DIAMETERS

RELATED APPLICATIONS

This application is continuation of U.S. application Ser. No. 10/427,752, filed Apr. 29, 2003, now U.S. Pat. No. 6,939,468, which is a continuation of U.S. application Ser. No. 09/415,320, filed Oct. 8, 1999, now U.S. Pat. No. 6,565,782, issued May 20, 2003, which is a divisional of U.S. application Ser. No. 08/764,321, filed Dec. 12, 1996, now U.S. Pat. No. 6,045,899, issued Apr. 4, 2000.

BACKGROUND OF THE INVENTION

1. Field of the Invention

The present invention relates to highly asymmetric, hydrophilic, microfiltration membranes having minimum pore sizes greater than about 0.1 μm in a minimum pore surface and gradually increasing pore sizes throughout the substructure of the membrane to a coarse pored surface having pore sizes up to about 100 μm.

2. Background of the Technology

Asymmetric or anisotropic membranes are well known in the art. For example, Wrasidlo in U.S. Pat. Nos. 4,629,563 and 4,774,039 and Zepf in U.S. Pat. Nos. 5,188,734 and 5,171,445, the disclosures of which are hereby incorporated by reference, each disclose asymmetric or anisotropic membranes and methods for their production. Each of the Wrasidlo and Zepf patents discloses integral, highly asymmetric, microporous membranes, having high flow rates and excellent retention properties. The membranes are generally prepared through a modified "phase inversion" process using a metastable two-phase liquid dispersion of polymer in solvent/nonsolvent systems which is cast and subsequently contacted with a nonsolvent. The Zepf patent discloses an improvement over the Wrasidlo patent.

Phase inversion processes generally proceed through the steps of: (i) casting a solution or a mixture comprising a suitably high molecular weight polymer(s), a solvent(s), and a nonsolvent(s) into a thin film, tube, or hollow fiber, and (ii) precipitating the polymer through one or more of the following mechanisms:

(a) evaporation of the solvent and nonsolvent (dry process);

(b) exposure to a nonsolvent vapor, such as water vapor, which absorbs on the exposed surface (vapor phase-induced precipitation process);

(c) quenching in a nonsolvent liquid, generally water (wet process); or (d) thermally quenching a hot film so that the solubility of the polymer is suddenly greatly reduced (thermal process).

Schematically, the inversion in phase from a solution to a gel proceeds as follows:

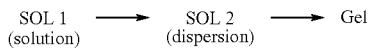

Essentially, SOL 1 is a homogenous solution, SOL 2 is a dispersion, and the Gel is the formed polymer matrix. The event or events that triggers SOL 2 formation depends on the phase inversion process used. Generally, however, the triggering event or events revolves around polymer solubility in the SOL. In the wet process, SOL 1 is cast and contacted with a nonsolvent for the polymer which triggers the formation of SOL 2 which then "precipitates" to a Gel. In the vapor phase-induced precipitation process, SOL 1 is cast and exposed to a gaseous atmosphere including a nonsolvent for the polymer which triggers the formation of SOL 2 which then "precipitates" to a Gel. In the thermal process, SOL 1 is cast and the temperature of the cast film is reduced to produce SOL 2 which then "precipitates" to a Gel. In the dry process, SOL 1 is cast and contacted with a gaseous atmosphere (such as air) which allows evaporation of one or more of the solvents which triggers the formation of SOL 2 which then "precipitates" to a Gel.

The nonsolvent in the casting dope is not necessarily completely inert toward the polymer, and in fact it usually is not and is often referred to as swelling agent. In the Wrasidlo-type formulations, as discussed later, selection of both the type and the concentration of the nonsolvent is important in that it is the primary factor in determining whether or not the dope will exist in a phase separated condition.

In general, the nonsolvent is the primary pore forming agent, and its concentration in the dope greatly influences the pore size and pore size distribution in the final membrane. The polymer concentration also influences pore size, but not as significantly as does the nonsolvent. It does, however, affect the membrane's strength and porosity. In addition to the major components in the casting solution, or dope, there can be minor ingredients, such as, for example, surfactants or release agents.

Polysulfone is especially amenable to formation of highly asymmetric membranes, particularly in the two-phase Wrasidlo formulations. These are not homogeneous solutions but consist of two separate phases: one a solvent-rich clear solution of lower molecular weight polymer at low concentrations (e.g., 7%); and the other a polymer-rich turbid (colloidal) solution of higher molecular weight polymer at high concentrations (e.g., 17%). The two phases contain the same three ingredients, that is, polymer, solvent, and nonsolvent, but in radically different concentrations and molecular weight distributions. Most importantly, the two phases are insoluble in one another and, if allowed to stand, will separate. The mix must be maintained as a dispersion, with constant agitation up until the time that it is cast as a film. Essentially, in Wrasidlo type formulations, the casting dope is provided in a SOL 2 (dispersion) condition. Thus, the dispersion serves as the starting point for gel formation and not as the intermediate step (above), as follows:

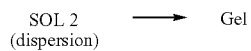

This process modification was largely responsible for the higher degrees of asymmetry and uniform consistency of the Wrasidlo Membranes as compared to the prior art.

It is the nonsolvent and its concentration in the casting mix that produces phase separation, and not every nonsolvent will do this. The two phases will separate from one another if allowed to stand, but each individual phase by itself is quite stable. If the temperature of the mix is changed, phase transfer occurs. Heating generates more of the clear phase; cooling does the reverse. Concentration changes have the same effect, but there is a critical concentration range, or window, in which the phase separated system can exist, as discussed by Wrasidlo. Wrasidlo defines this region of instability on a phase diagram of thus dispersed polymer/solvent/nonsolvent at constant temperature, lying within the spinodal or between spinodal and binodal curves, wherein there exist two macroscopically separated layers.

Because of the great hydrophobicity of the polymer and because of the thermodynamically unstable condition of the casting mix, wherein there pre-exist two phases, one solvent-rich and the other polymer-rich (a condition that other systems must pass through when undergoing phase inversion), the unstable Wrasidlo mixes precipitate very rapidly when quenched so as to form a microporous skin at the interface and consequently develop into highly asymmetric membranes, a structure shared by the membranes of each of the Wrasidlo and Zepf patents.

"Asymmetric" as used in the context of the Wrasidlo patents refers to membranes that possess a progressive change in pore size across the cross-section between the microporous skin and the substructure. The progressive asymmetry of Wrasidlo-type membranes stands in contrast to reverse osmosis and most ultrafiltration membranes which have abrupt discontinuities between a "nonmicroporous skin" and substructure and are also referred to in the art as asymmetric.

The microporous skin is the fine pored side of the membrane that constitutes the air-solution interface or the quench-solution interface during casting. In the Wrasidlo patent, and in this disclosure, it is understood that the term "skin" does not indicate the relatively thick, nearly impervious layer of polymer that is present in some membranes. Herein, the microporous skin is a relatively thin, porous surface that overlies a microporous region of variable thickness. The pores of the underlying microporous region may be the same size as, or somewhat smaller than, the skin pores. In an asymmetric membrane, the pores of the microporous region gradually increase in size as they lead from the skin to the opposite face of the membrane. The region of gradual pore size increase is sometimes referred to as the asymmetric region, and the opposite, non-skin face of the membrane is often referred to as the coarse pored surface. As a contrast to the coarse pored surface, the skin is also sometimes called the microporous surface.

Polymeric membranes can also be cast from homogeneous solutions of polymer. The composition of these formulations lies outside of the spinodal/binodal region of the phase diagram of Wrasidlo. Membranes cast from homogeneous solutions may also be asymmetric, although they are not usually as highly asymmetric as those cast from phase separated formulations.

The Wrasidlo membranes have improved flow rates and permselectivity in relation to prior art membranes. Such improved flow rates and permselectivity arise from the structure of the membranes.

The Zepf patents disclose improved Wrasidlo-type polymer membranes having a substantially greater number of microporous skin pores of more consistent size, and greatly increased flow rates, with reduced flow covariance for any given pore diameter. The improved Zepf membranes are achieved by modifications to the Wrasidlo process, comprising reduced casting and quenching temperatures, and reduced environmental exposure between casting and quenching. Zepf further teaches that reduced casting and quenching temperatures minimize the sensitivity of the membrane formation process to small changes in formulation and process parameters.

Increasing the surface pore size of membranes has been described. See UK Patent No. 2,199,786 to Fuji (herein "Fuji"). The Fuji patent, as well as other references, teach that when one exposes a cast polymer solution to humid air, a phase inversion at a point below the surface of the membrane will occur. Membranes produced in accordance with the Fuji process have a characteristic structure of relatively wide pores on the surface, from 0.05 to 1.2 µm, followed by progressively constricting pore sizes to the phase inversion point below the surface, followed by an opening of the pores until an isotropic structure is achieved progressing to the cast surface, from 1 to 10 µm). Accordingly, the Fuji membranes can be thought of as having reverse asymmetry from the skin surface to the point of inversion and asymmetry progressing into an isotropic structure. The patent expressly teaches that minimal asymmetry should be used in order to prolong the life of the membranes. See Page 4, Lines 7–29.

Asymmetric microfiltration membranes are useful in many applications. For example, such membranes can be used for a variety of filtration applications for purification and testing in the food and beverage industry, water treatment, pharmaceuticals, and in medical laboratories. The membranes are useful in a variety of forms, including, for example, disks and cartridges. Such membranes have become increasingly relevant to the testing industry for uses as diverse as trace metals analysis and medical diagnostics. The membranes have a large pore surface and a microporous surface. Through applying a solids-containing liquid sample to the large pore surface, a liquid, largely free of solids, emerges from the microporous surface. The solids-free liquid filtrate then can be tested without interference from the solid. Such testing can be accomplished chemically, electrically, or through use of various kinds of analytical equipment.

One illustrative testing application is offered in the diagnostic industry for which asymmetric membranes have proven particularly suited in blood separation applications. See e.g., Koehen et al. U.S. Pat. No. 5,240,862. Whole blood is applied to the open pored surface, the cells are filtered out and retained in the porous support of the membrane, and the plasma passes through the membrane. By placing the microporous surface in contact with an analyte detection device, the presence or absence of a particular analyte can be measured without the interference of the cells. Further, this structure allows one to conduct diagnostic assays without centrifugation.

As was mentioned above, asymmetric membranes can be prepared from certain hydrophobic polymers, such as sulfone polymers and mixed cellulose esters. The sulfone polymers generally include three polymer classes: polysulfones, polyethersulfones, and polyarylsulfones. Where membranes are prepared using hydrophobic polymers, however, the resulting membranes are hydrophobic and water will not generally pass through them under reasonable operating conditions. Therefore, in applications requiring operation of the membranes in aqueous environments, the membranes, or the polymers prior to fabrication into membranes, are typically reacted with, or mixed with, respectively, moieties that cause the resulting membranes to become hydrophilic.

For example, there are several strategies for creating hydrophilic membranes from hydrophobic polymers, including: sulfonating hydrophobic polymers prior to casting them as membranes; contacting cast hydrophobic membranes with agents that impart hydrophilic properties to the cast membranes; and including hydrophilic moieties in the casting dope prior to casting membranes therefrom.

Each of these methods for imparting hydrophilicity to membranes has inherent problems or difficulties. For example, where a membrane is post-treated with a moiety to impart hydrophilicity there is a potential that the moiety will leach and contaminate the sample. One can attempt to minimize leaching through crosslinking certain moieties on the surface of the cast membrane. For example, Roesink et al. in U.S. Pat. No. 4,798,847 to (now Re. No. 34,296) disclose crosslinking PVP throughout the structure of polysulfone membranes. However, while crosslinking hydrophilic moieties to membranes appears to minimize leaching, it can add additional steps and complexities to the fabrication process of a membrane. Further, depending on the conditions required for the crosslinking, membrane strength and/or rigidity can be compromised.

Where hydrophobic polymers are sulfonated prior to casting, it is very difficult, if not impossible, to prepare asymmetric membranes therefrom. Thus, one is constrained to manufacture only isotropic membranes.

Another approach to imparting hydrophilicity to membranes involves the inclusion of a hydrophilic moiety within the casting suspension. For example, Kraus et al. in U.S. Pat. Nos. 4,964,990 and 4,900,449 disclose formation of hydrophilic microfiltration membranes from hydrophobic polymers through inclusion in the casting solution of a hydrophilic polymer, such as polyethylene glycol or polyvinylpyrrolidone. The membranes prepared in accordance with the Kraus patents are, however, isotropic and are therefore not well suited to applications that require asymmetric membranes.

Accordingly, it would be desirable to provide an asymmetric microporous membrane having a high degree of stable hydrophilicity, sufficient strength and rigidity, and that operates efficiently in separations and testing applications.

SUMMARY OF THE INVENTION

The present invention relates to highly asymmetric, hydrophilic, microfiltration membranes having minimum pore sizes greater than about 0.1 μm in a minimum pore surface and gradually increasing pore sizes throughout the substructure of the membrane to a coarse pored surface having pore sizes up to about 100 μm.

One aspect of the invention provides an asymmetric integral sulfone polymer membrane, rendered hydrophilic through co-casting the sulfone polymer with a hydrophilic polymer. The membrane of this aspect of the invention has a microporous skin and a porous support. The microporous skin has a high density of skin pores, and the skin pores have an average diameter of from about 0.1 micron to about 10 microns.

The porous support is an asymmetric structure of gradually increasing pore sizes. The average diameter of the largest pores, on the coarse pored surface of the membrane may range from about 5 to about 1000 times the diameter of the skin pores.

Membranes of this aspect of the invention are particularly uniform in the size of their limiting pores, and may have a mean flow pore size of from about 0.1 μm to about 10 μm. Further, these membranes have at least about 15 skin pores per 1000 μm² of minimum pore surface. Membranes of this aspect of the invention may be cast to have a greater thickness than previous membranes, and in many embodiments of the invention, the membrane thickness is at least about 150 μm.

The composition of the membrane includes a sulfone polymer, which may be, for example, polysulfone, polyethersulfone, or polyarylsulfone. The hydrophilic polymer may be polyvinylpyrrolidone. The membranes of the invention also possess lateral wicking speeds of water of at least about 5 mm/second.

In another aspect of the invention, a method is provided for preparing an asymmetric hydrophilic integral sulfone polymer membrane. The membranes produced by this method have a microporous skin and a porous support. The microporous skin is has a high density of skin pores, and the skin pores have an average diameter of from about 0.1 micron to about 10 microns. The porous support has an asymmetric region of gradually increasing pore sizes, to an average diameter of from about 5 to about 100 times the diameter of the skin pores.

The first step of the method is to provide a casting dope with between about 9% and 12% by weight of a sulfone polymer and between about 3% and 15% by weight of a hydrophilic polymer, dissolved in a solvent. The dope is next cast to form a thin film. The thin film is exposed to a gaseous environment, including water vapor at a relative humidity of between about 50% and 80% for between about 2 seconds and 20 seconds. The film is then coagulated in a water bath having a temperature between about 20° C. and 70° C. Finally, the membrane is recovered from the water bath.

The casting dope may be a homogeneous solution, and may additionally contain a nonsolvent for the sulfone polymer. The casting dope may also be a dispersion.

Membranes made by the method of this aspect of the invention have a mean flow pore size of from about 0.1 μm to about 10 μm. They may also possess a density of skin pores of at least about 15 pores per 1000 μm², and may be at least about 150 μm in thickness.

The sulfone polymer of the dope mix may be, for example, polysulfone, polyethersulfone, or polyarylsulfone, and the hydrophilic polymer may be polyvinylpyrrolidone. The membranes made by this method may possess a lateral wicking speed of water of at least about 5 mm/second.

Another aspect of this invention is an improved diagnostic device of the type employing a separation membrane and a contact membrane. The improvement consists of a separation membrane that is an asymmetric integral sulfone polymer membrane, rendered hydrophilic through co-casting the sulfone polymer with a hydrophilic polymer. This membrane has a microporous skin and a porous support, the microporous skin possessing a high density of skin pores. The skin pores may have an average diameter of from about 0.1 micron to about 10 microns, and the porous support is an asymmetric region of gradually increasing pore sizes, to an average diameter of from about 5 to about 100 times the diameter of the skin pores.

The membrane in the improved device of the invention may have a mean flow pore size of from about 1 μm to about 10 μm, a density of skin pores of at least about 15 pores per 1000 μm², and may be at least about 150 μm in thickness. The sulfone polymer in membrane of the device may be, for example, polysulfone, polyethersulfone, or polyarylsulfone, and the hydrophilic polymer may be polyvinylpyrrolidone. The device may be a lateral wicking device, and the membrane therein may have a lateral wicking speed of water of at least about 5 mm/second.

BRIEF DESCRIPTION OF THE DRAWINGS

FIG. 1 presents three scanning electron micrographs of a membrane in accordance with the invention.

FIG. 2 presents three scanning electron micrographs of a membrane in accordance with the invention.

DETAILED DESCRIPTION OF THE PREFERRED EMBODIMENTS

Figure 1A:
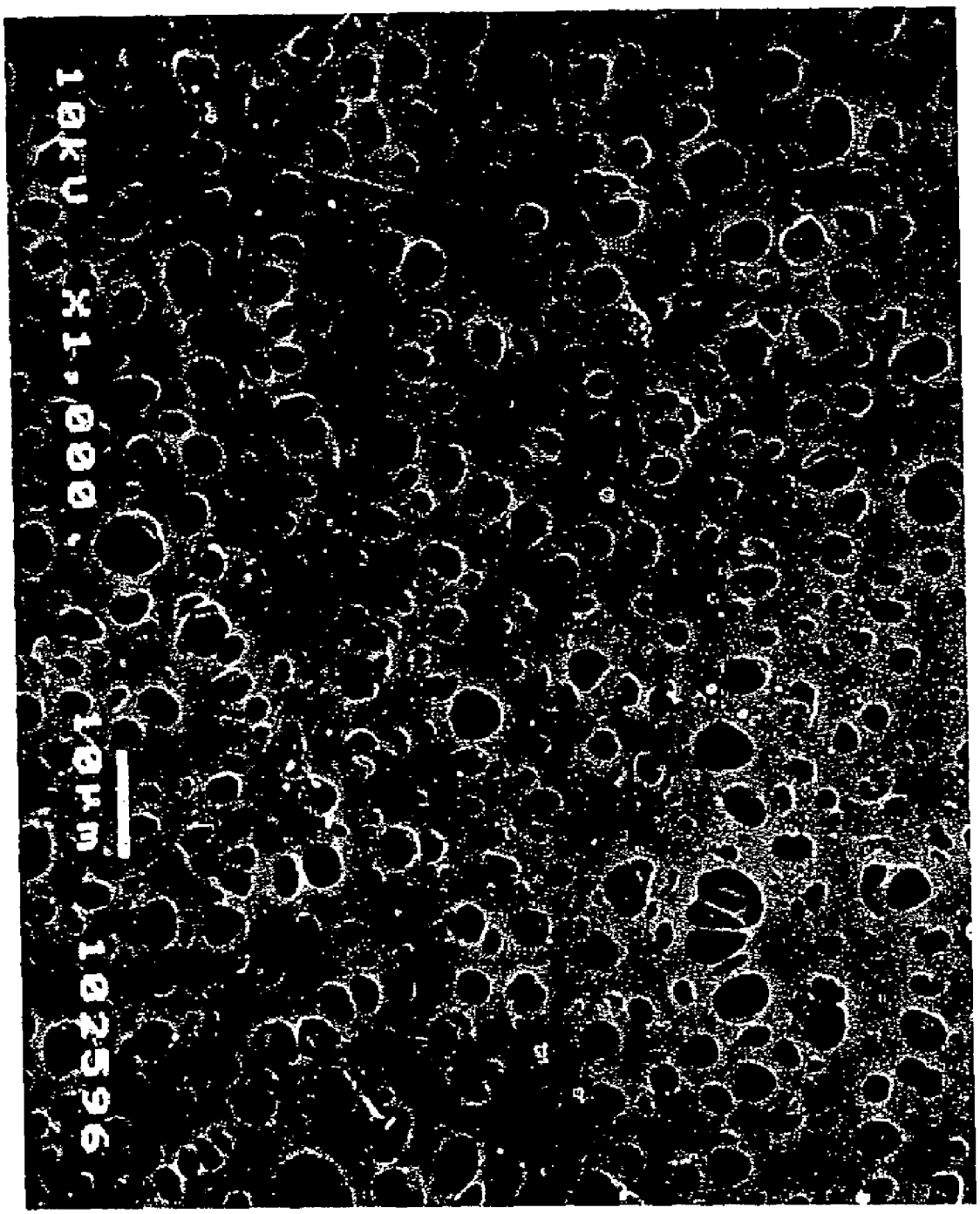
FIG. 1a is a top view of the membrane which shows the microporous surface of the membrane.

In accordance with the present invention we have developed highly asymmetric microfiltration membranes having minimum pore sizes greater than about 0.1 μm in a minimum pore surface and gradually increasing pore sizes throughout the substructure of the membrane to a coarse pored surface. The minimum pore surface preferably possesses pore sizes of about 0.1 μm to about 10 μm and the pore size gradually increases throughout the substructure of the membrane from the minimum pore surface to the coarse pored surface, where the pore sizes may be from about 5 μm to about 100 μm, depending upon the pore size at the minimum pore surface. Thus, the degree of asymmetry in the membrane, being the ratio of the pore sizes in the coarse pored surface compared to the pore sizes in the minimum pore surface, is between about 5 and about 1000. The membranes of the invention, further, are substantially free of macrovoids, which are voids that materially vary in size from the surrounding porosity. The preferred membranes of the invention also have a bulk porosity, or void volume, of about 80% or greater.

Membranes in accordance with the invention are useful for separation of fluids containing relatively large particles. One area in which membranes of the invention possess significant utility is in blood cell separation. For example, the membranes of the invention can be used to separate large blood cells, such as leukocytes, lymphocytes, platelets, neutrophils, B-cells, T-cells, monocytes, and macrophages, from red blood cells, based on the size differences of these cell types.

To assist in a given separation system, membranes in accordance with the invention can be further processed. Such processing may include modifying the surface of the membrane to increase its hydrophilicity, add functional groups, and the like, in order to enhance the ability of the membrane to remove desired materials. For example, one highly effective additional processing modification that can be utilized is charge-modification of the membrane surface. Such charge-modification results in a membrane that is capable of removing or exchanging ions as a step in the filtration process.

Membranes in accordance with the invention are preferably prepared utilizing a relatively hydrophobic polymer. The hydrophobic polymer is a sulfone polymer, which encompasses any polymer containing a sulfone moiety, as shown below.

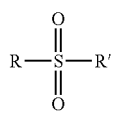

SULFONE MOIETY

Examples of sulfone polymers are polysulfone, polyethersulfone, and polyarylsulfone. A hydrophilic second polymer is utilized in addition to the hydrophobic polymer. Preferably, the second polymer is polyvinylpyrrolidone. It may also be a co-polymer derivative of polyvinylpyrrolidone, such as a polyvinylpyrrolidone/polyvinylacetate co-polymer.

Casting solutions in accordance with the invention preferably include both a solvent for the polymer and a non-solvent for the polymer. The non-solvent for the polymer is preferably a solvent for the second polymer, if a second polymer is present. Further, when the dope solution is prepared, the second polymer, being hydrophilic, may itself act as an additional nonsolvent for the polymer. Therefore, nonsolvents may include any part of the dope mix that does not contribute to the solubility of the polymer. The collective group of nonsolvents may be subdivided for convenience of reference between "polymer nonsolvents" and "nonpolymer nonsolvents," or "other nonsolvents." A typical polymer nonsolvent is polyvinylpyrrolidone, and a typical nonpolymer nonsolvent is water.

Casting solutions are preferably homogeneous and stable. However, in certain embodiments, it may be desirable to utilize unstable dispersions that may range from slightly to highly unstable.

In preferred embodiments, casting formulations are prepared utilizing the following ratios:

| | |
|---|---|
| sulfone polymer | about 9% to about 12% |
| polyethylene glycol | about 15% to about 25% |
| polyvinylpyrrolidone | about 3% to about 15% |
| other nonsolvent (water) | about 0.5% to about 5% |
| solvent (balance) | (about 43% to about 72.5%) |

In this formulation, polyethylene glycol, polyvinylpyrrolidone, and water all function as nonsolvents in the dope mix. Accordingly, in this formulation, the total nonsolvents may constitute between about 18.5% and 45% of the dope mix.

Membranes in accordance with the invention are ordinarily cast using well known techniques for casting phase inversion membranes. For example, membranes may be cast using a doctor blade or a slot coater. Such membranes are cast to a predefined thickness, preferably onto a moving belt of, for example, polyethylene coated paper. It is also preferable to expose the cast membrane to humid air prior to quenching the membrane. Exposure times may vary, depending on the degree of openness desired for the membrane pores. Humid air exposure acts to open the pores of the forming membrane. Preferred exposure times range from 2 to 20 seconds and preferably from 2 to 15 seconds and most preferably 3 to 10 seconds. Relative humidities are preferably in the range of about 50% to 90% relative humidity and more preferably 55% to 80% relative humidity and most preferably 60% to 75% relative humidity.

In accordance with the present invention, we have unexpectedly discovered that it is possible to manufacture an asymmetric, highly hydrophilic, microfiltration membrane from a hydrophobic polymer that is co-cast as a solution or dispersion with a hydrophilic agent or moiety. In preferred embodiments, the membranes of the invention are manufactured from a sulfone polymer and polyvinylpyrrolidone.

Advantages of the Membranes of the Invention

Prior to the developments disclosed herein, highly asymmetric, Wrasidlo-type membranes were limited both in their pore size and in their maximum thickness. Without wishing to be bound by any particular theory, the common explanation for these limits was as follows: Highly asymmetric membranes generally are cast from unstable or metastable dispersions. The dynamics of phase separation in these dispersions requires a relatively low-viscosity, fast-gelling formulation. It is the dynamic nature of the dispersion that facilitates the achievement of high degrees of asymmetry in Wrasidlo-type membranes. However, the low viscosity of those dope mixes puts a natural limit on the thickness at which they may be cast. The low viscosity also places a limit on the amount and kind of nonsolvents that are used in Wrasidlo-type membranes.

In contrast, the membranes of the present invention use relatively viscous dope mixes. Much of the viscosity of these mixes is due to the presence of non-solvent hydrophilic polymers. In addition to increasing the viscosity of the dope mix, these hydrophilic polymer nonsolvents also create larger pores, a greater bulk porosity, and of course, a very hydrophilic membrane.

Accordingly, the present invention represents a significant improvement beyond the limits of earlier highly asymmetric membranes. The disclosed dope mix composition and casting parameters result in a membrane that is highly asymmetric, similar to Wrasidlo-type membranes, while at the same time having larger pore sizes, a greater maximum membrane thickness, and a much greater hydrophilicity than previous highly asymmetric membranes. The membrane of the invention may be about 100 to 1000 microns thick, or more. Preferably, the thickness of the membrane is about 125 to 400 microns. More preferably, the membrane thickness is about 150 to 300 microns. There is no known practical limit to the thickness that may be achieved using the formulation of the invention. Accordingly, preferred embodiments are determined by what is known be most useful for present applications.

Architecture of the Membranes of the Invention

Figure 1B:
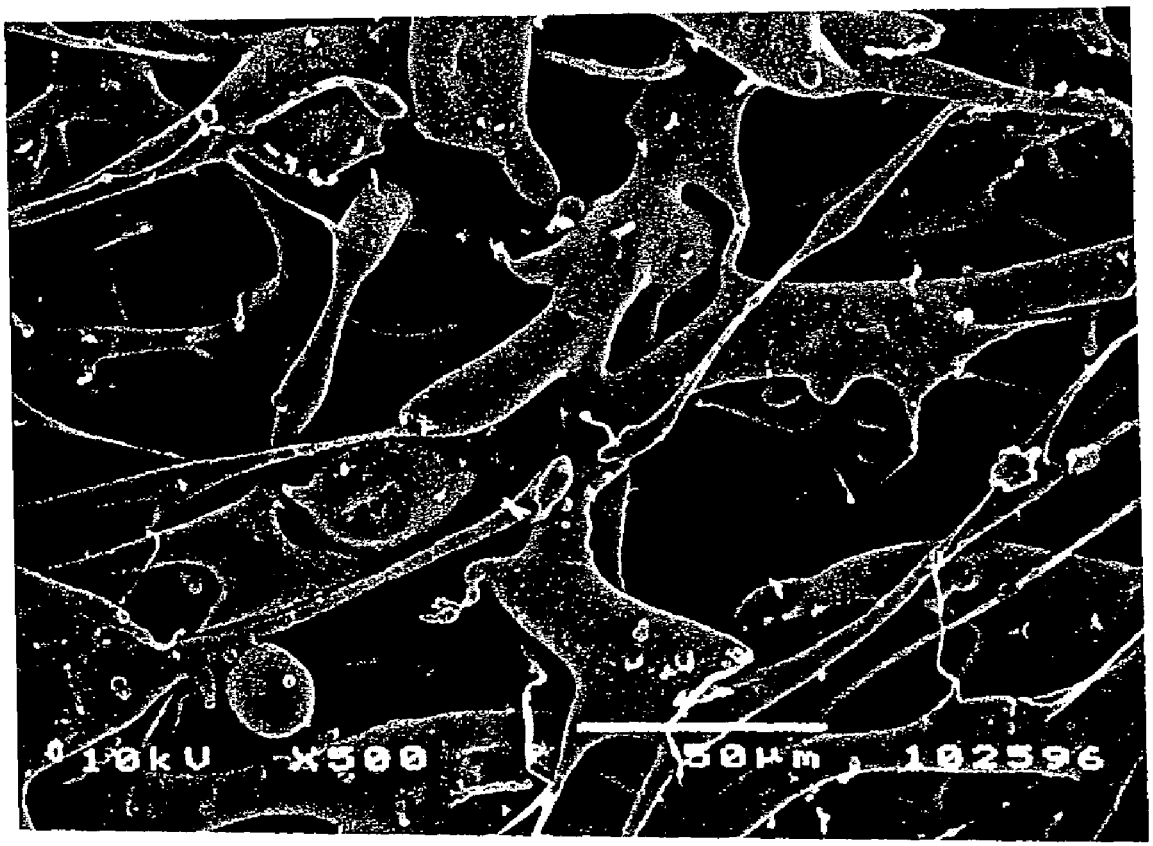
FIG. 1b shows the coarse pored surface of the membrane.
Figure 1C:
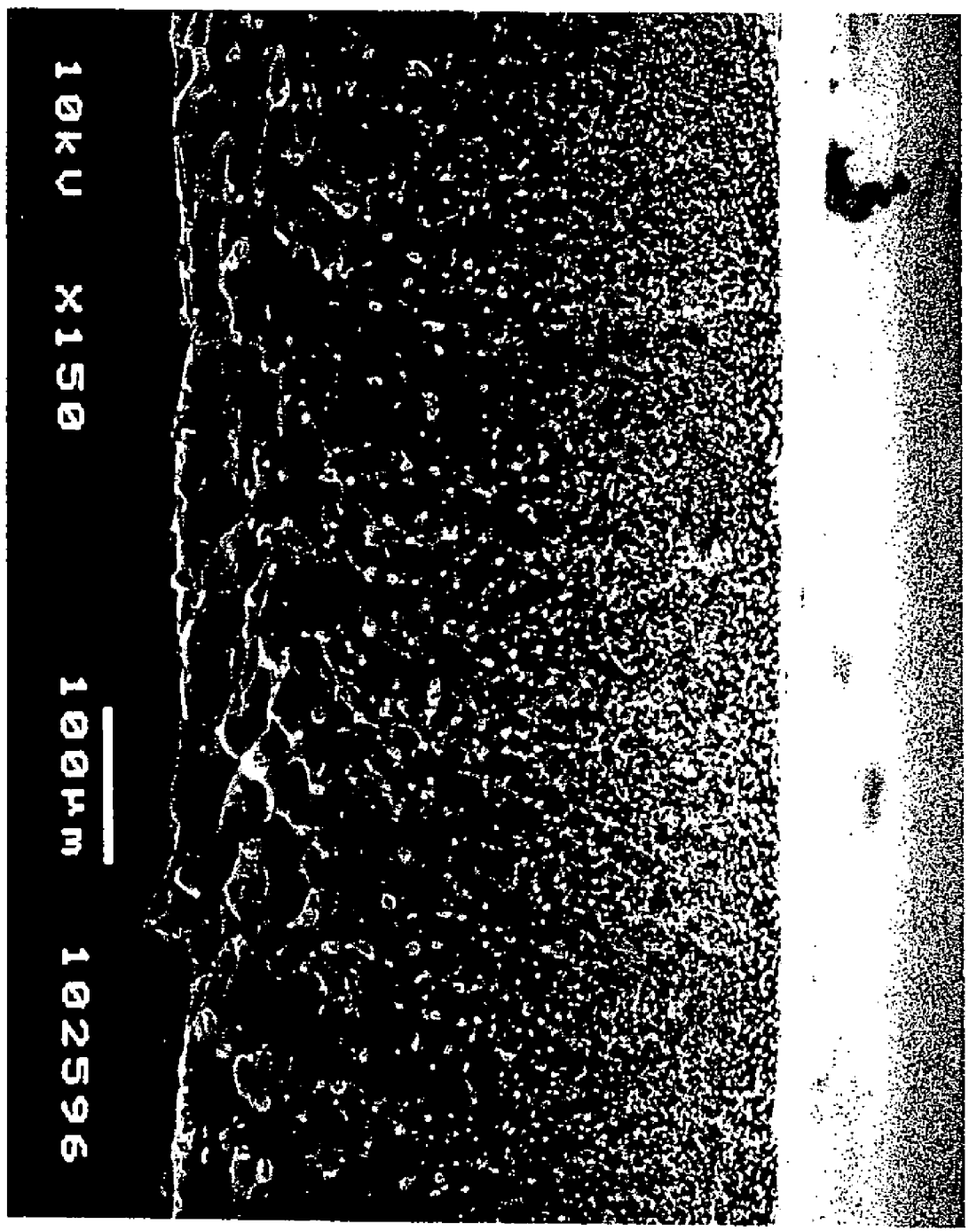
FIG. 1c shows the membrane in cross section.
Figure 2A:
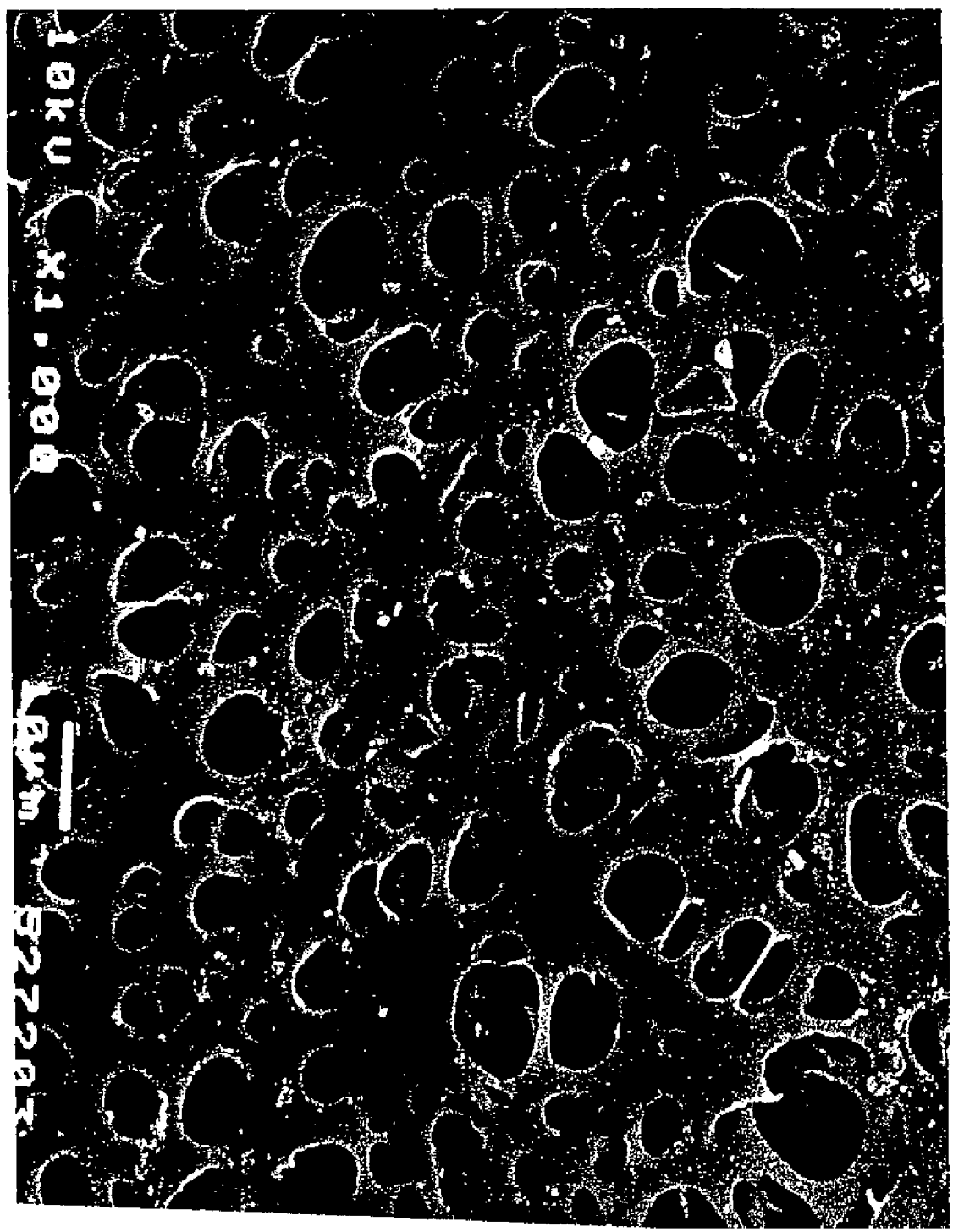
FIG. 2a is a top view of the membrane which shows the microporous surface of the membrane.
Figure 2B:
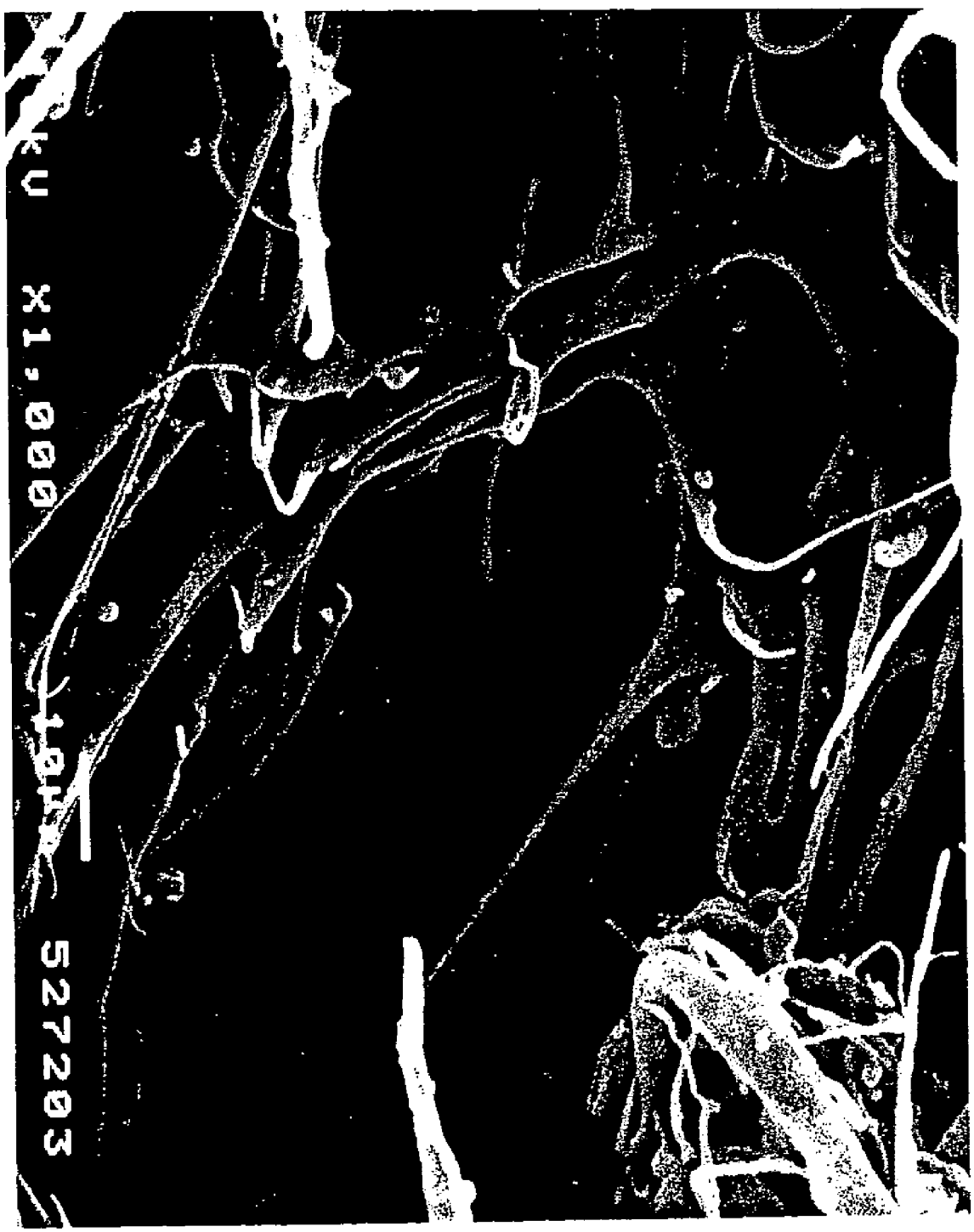
FIG. 2b shows the coarse pored surface of the membrane.
Figure 2C:
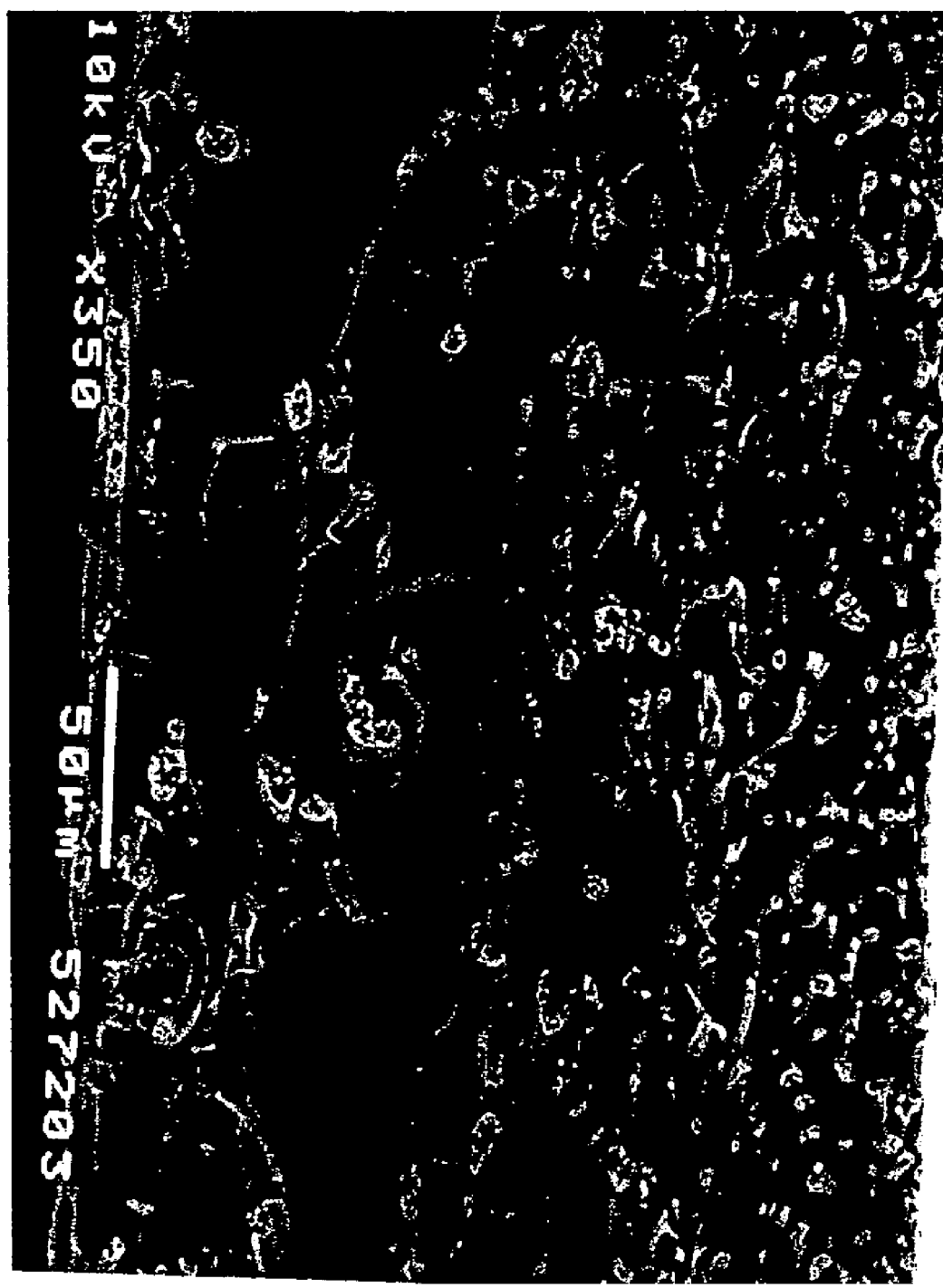
FIG. 2c shows the membrane in cross section.

The polymer membranes of the invention retain a substantial degree of asymmetry while having relatively large microporous skin pores. A convenient method for assessing the asymmetry and pore size of membranes is through use of scanning electron microscopy (SEM). FIGS. 1 and 2 show the cross section, microporous skin surface, and coarse pored surface of membranes prepared according to the invention. The features of those membranes can be compared to those of a conventional Wrasidlo-type fine pore membrane shown in FIG. 3. In general, the average microporous skin pore size or diameter of the microporous skin pores of the membranes of the invention is greater than about 0.1 µm, and typically is greater than 0.5 µm or 1.0 µm.

In the absence of SEM data, asymmetry can be roughly estimated as described by Kesting, *Synthetic Polymer Membranes: A Structural Perspective*, p. 275 (John Wiley & Sons, 2d edition (1985)), by applying a small dot of ink or dye to the tight face of a membrane and allowing the dye to penetrate the membrane as well as spread on its surface. The ratio of the areas coated with dye gives a general indication of asymmetry, or the degree thereof.

Pore size can also be estimated by porometry analysis and by separate measurement of the bubble point, with a higher bubble point indicating tighter pores. Porometry consists of applying gradually increasing pressures on a wet membrane and comparing gas flow rates with those of the dry membrane which yields data on pore sizes as well as the bubble point. For these analyses, a Coulter Porometer Model 0204 was used. Porometry measurements give the "mean flow pore size" of the membrane. The mean flow pore size is the average size of the limiting pores in a membrane. In highly asymmetric membranes such as those of the present invention, the limiting pores are generally very near the skin. However, because of the characteristics of the skin surface as defined herein, the mean flow pore size may be smaller than the average skin pore size, because the limiting pores may not be on the skin surface. Accordingly, a proper judgment of the size of pores in a highly asymmetric membrane includes consideration not only of the average skin pore size as determined from SEM, but also includes consideration of the mean flow pore size as determined from porometry testing.

The mean flow pore size is based on the pressure at which air flow begins through a prewetted membrane (the bubble point pressure) compared to the pressure at which the air flow rate through a prewetted membrane is half the air flow rate through the same membrane when dry (the mean flow pore pressure). The bubble point pressure indicates the size of the largest limiting pores, and the mean flow pore pressure indicates the mean size of the limiting pores. Accordingly, by comparing these two values, one can determine not only the average size of the limiting pores in a membrane, but can also determine the uniformity of limiting pore sizes. The membranes of the invention have a much higher uniformity of pore size than other membranes with large pore diameters.

Substantially asymmetric, as used herein, means a degree of asymmetry similar to that disclosed in, and possessed by, membranes prepared in accordance with Wrasidlo and Zepf patents. In that regard, the membranes of the present invention have average microporous skin pore sizes of greater than about 0.1 µm, while on the reverse side, the side adjacent to the support paper or belt during casting, SEMs show that the average pore sizes are at least five times the average microporous skin pore size. Thus, the ratio of microporous skin pore size to cast surface pore size is about 5:1, and in highly preferred embodiments is 10:1, 50:1, 100:1, or even 1000:1. The particular membranes of the Figures have water bubble points of up to 5 psid, reflecting their relatively large pore size and hydrophilic properties. The unit psid indicates the pounds per square inch differential, reflecting the air pressure applied on one side of a membrane compared to the air pressure existing on the opposite side of the membrane.

Preparation of the Membranes of the Invention

Generally membranes in accordance with the invention are prepared through conventional approaches. A polymer casting solution or dispersion is prepared which is then cast, exposed to a gaseous environment for a predetermined period of time, and then quenched in a nonsolvent bath. Preferred casting solutions and casting processes are discussed below.

Casting Solutions With or Without Nonpolymer Nonsolvents

Membranes in accordance with the invention can be prepared from homogeneous solutions as well as dispersions. In preferred embodiments, the membranes of the invention are prepared from homogeneous solutions. Homogeneous solutions can be prepared through use of solvents alone, or in combination with nonsolvents. Membranes prepared from dispersions can be formed with bubble points in the same general range as those made from homogeneous solutions. However, such membranes generally require longer periods of exposure to the air before quenching.

The membranes of the invention are preferably prepared from a homogeneous solution containing a hydrophobic polymer, such as, for example, a sulfone polymer; a hydrophilic polymer such as, for example, polyvinylpyrrolidone; and a suitable solvent for the hydrophobic polymer and the hydrophilic polymer.

In preferred embodiments, the hydrophobic polymer is a sulfone polymer such as polysulfone, polyarylsulfone, or polyethersulfone, and preferably polysulfone, and most preferably Udel 3500 polysulfone from AMOCO (Alpharetta, Ga.).

Where polysulfone is utilized, the polymer concentration is generally between about 8–17%, or more preferably between about 9–15%, and most preferably between about 10–12%.

The hydrophilic polymer may be any polymer that is compatible with the hydrophobic polymer. In preferred embodiments, the hydrophilic polymer is polyvinylpyrrolidone. In another preferred embodiment, the hydrophilic polymer is a co-polymer of polyvinylpyrrolidone and polyvinylacetate. The hydrophilic polymer is included at between about 3 and 15%, more preferably between about 3 and 12%, and most preferably between 4 and 10%.

The solvent is selected so as to be a good solvent for each of the hydrophobic polymer and the hydrophilic polymer. Where the hydrophobic polymer is polysulfone and the hydrophilic polymer is polyvinylpyrrolidone, we have found that N-methyl pyrrolidine, dimethyl formamide, and dimethyl acetamide operate effectively as the solvent. In highly preferred embodiments, dimethyl formamide is utilized as the solvent.

In general, polymer solutions in accordance with the invention are prepared as shown in Table I:

TABLE I

| Constituent | Ratio |
| --- | --- |
| Hydrophobic Polymer | 8–17% |
| Hydrophilic Polymer | 3–15% |
| Solvent/Other Nonsolvent | Balance |

In highly preferred embodiments, polymer solutions are prepared as shown in Table II:

TABLE II

| Constituent | Ratio |
| --- | --- |
| Sulfone Polymer | 8–17% |
| Polyvinylpyrrolidone | 3–15% |
| Solvent/Other Nonsolvent | Balance |

Partial or complete dispersion formulations can be prepared through the inclusion of a nonsolvent for at least the hydrophobic polymer. For example, water may be added to the formulations in sufficient quantities to create a dispersion casting dope. Alternatively, smaller quantities of nonsolvents, or weaker nonsolvents than water, may be utilized to form homogeneous solutions. Where a complete dispersion is desired, one can add another nonsolvent, for example an alcohol such as tertiary amyl alcohol in a sufficient quantity to replace or supplement water as the nonsolvent. Thus, combinations of nonsolvents, or single species of nonsolvents, can be utilized in accordance with the invention to prepare casting dopes with particular qualities. High nonsolvent concentrations can be used to create dispersion formulations, whereas, lower nonsolvent concentrations can be used to form homogeneous solutions. Quantities of nonpolymer nonsolvent can be varied from about 0.1% through about 10%. In preferred embodiments, water is utilized as the nonpolymer nonsolvent in an amount effective to prepare a homogeneous casting dope. For example, where water is utilized as the nonsolvent, the water is preferably included in the casting dope from about 0.1% through about 3.0%, and, in highly preferred embodiments, at about 1% to 2%.

Casting Solutions to Form Membranes

The polymer solution is typically cast into a thin film, exposed to a gaseous environment for a predetermined period of time, then quenched in a nonsolvent. The membranes of the invention can be cast using any conventional procedure wherein the casting dispersion or solution is spread in a layer onto a nonporous support from which the membrane later can be separated after quenching. The membranes can be cast manually by being poured, cast, or spread by hand onto a casting surface followed by application of a quench liquid onto the casting surface. Alternatively, the membranes may be cast automatically by pouring or otherwise casting the dope mix onto a moving bed. A preferred moving bed support is polyethylene coated paper. In casting, particularly in automatic casting, mechanical spreaders can be used. Mechanical spreaders include spreading knives, a doctor blade, or spray/pressurized systems. A preferred spreading device is an extrusion die or slot coater, which comprises a chamber into which the casting formulation can be introduced and forced out under pressure through a narrow slot. Membranes may be cast by means of a doctor blade with a knife gap of typically about 15 through about 50 mils, preferably about 16 through about 25 mils, and more preferably about 19 mils. The relationship between the knife gap at casting and the final thickness of the membrane is a function of the composition and temperature of the dope mix, the duration of exposure to humid air, the relative humidity of the air during exposure, and the temperature of the quench bath. Membranes typically collapse upon gelling, losing from about 20% to about 80% of their thickness.

Following casting, the cast dispersion or solution is quenched. In a preferred embodiment, quenching is accomplished by moving the cast membrane on a moving belt into the quenching liquid, such as a water bath. The quenching liquid is most commonly water. In the bath, the quench operation precipitates or coagulates the polymer and can produce a microporous skin having the requisite pore sizes and a support region having the characteristic structure. The resulting membrane is ordinarily washed free of entrained solvent and may be dried to expel additional increments of solvent, diluent, and quench liquid, and thus recover the membrane. After the quenching step, the microporous membrane product is typically about 100 to 400 microns thick.

Generally, in preparing the membranes of the invention, prior to quenching, the cast film should be exposed to air sufficiently long to induce the formation of large surface pores, as discussed previously. The shorter the exposure, the higher the humidity must be, and vice versa. The total humidity is the important factor. At higher ambient air temperatures, the relative humidity can be lower for the same effect. The temperatures of the casting mix and the quench bath are also important parameters. In general, the warmer the quench, the more open will be the membrane.

Generally, in the manufacture of membranes in accordance with the invention, casting solution or dispersion temperatures of between about 20° C. and 35° C. and quench bath temperatures of between about 20° C. and 70° C., and preferably 30° C. to about 60° C. are utilized. The temperature of the quench bath appears to cause marked changes in the pore sizes of the microporous skin of the membrane and also in its asymmetry. Where higher quench temperatures are utilized, the membranes possess both larger skin pores and enhanced asymmetry. Conversely, where lower temperatures are utilized, smaller pores form and asymmetry can be reduced.

Another factor that is important to the manufacture of the membranes of the invention is the exposure time and exposure conditions that exist between the casting of the polymer solution and quenching of the membranes of the invention. Preferably, the cast solution or dispersion is exposed to humid air after casting but before quenching. Relative air humidity is preferably greater than about 60%. In addition, the air is preferably circulated to enhance contact with the cast solution or dispersion. Circulation can be accomplished with a fan, for example.

The exposure time is generally from about 2 seconds to about 20 seconds. Increasing exposure time, over this range, tends to increase permeability of the resulting membrane. However, where the exposure time is too long, or, the humidity is too high, the surface porosity can be detrimentally affected. In such a situation, it appears that a relatively nonporous skin results and the membrane ceases to be microporous.

For lateral wicking separation membranes composed of a sulfone polymer and polyvinylpyrrolidone, we find that a temperature between about 35° C. and 50° C. results in a highly favorable pore size and degree of asymmetry. Further, the air exposure most preferably lasts between about 3 and 10 seconds where the air preferably has a relative humidity of between about 65 and 80%. As will be understood, relative humidity and exposure time are important conditions that are generally inversely proportional in their effects. Thus, the higher the relative humidity, the shorter can be the exposure time.

Pore Density

Pore density can be easily computed for a given membrane sample by viewing a scanning electron micrograph of the surface of the membrane of interest of a given square surface area and computing the number of pores contained in the given area. The number of pores computed to be in a given square area can be normalized to a particular reference square area through a simple ratio. For example, the traditional Wrasidlo-type membrane with the highest pore density had in the range of about 8 pores/1000 $\mu m^2$. In contrast, membranes prepared in accordance with the present invention possess about or greater than double the pore density of the most pore-dense Wrasidlo-type membranes. The membrane shown in FIG. 1a, for example, has more than 50 pores/1000 $\mu m^2$. In addition, the membrane shown in FIG. 2a has more than 30 pores/1000 $\mu m^2$. Thus, preferred membranes prepared in accordance with the present invention can be characterized as possessing a pore density greater than 15 pores/1000 $\mu m^2$. In more preferred embodiments, the pore density is greater than 25 pores/1000 $\mu m^2$, and most preferably, greater than 30 pores/1000 $\mu m^2$.

Use of the Membranes of the Invention in Separation Applications

The membranes of the invention are useful for, and exceptionally efficient in, testing and separation applications. In particular, the membranes of the invention are efficient in filtration of food products, including juices and other beverages. The membranes of the invention are also efficient in blood separation protocols, wherein it is desirable to separate the particulate, mostly cellular, fraction of the blood from the plasma thereof. Further, the membranes of the invention are highly effective in the filtration of water and sewage, and may also be useful in thin-film chromatography applications.

Improved Diagnostic Device

One example of the separation and testing applications for which the membranes of the invention are useful in is in diagnostic applications, such as the diagnostic-type devices of the sort disclosed in Koehen et al. U.S. Pat. No. 5,240,862, the disclosure of which is hereby incorporated by reference. The Koehen et al. patent discloses a blood separation system including an asymmetric membrane in intimate contact with a collector membrane. A similar system is disclosed in Kiser et al. U.S. Pat. No. 5,306,623. In each, whole blood may be applied to the coarse pored side of an asymmetric membrane that is, or is rendered, hydrophilic, and the blood cells will be filtered out in the larger pores of the asymmetric membrane, with plasma passing through the microporous surface to contact the collector membrane.

The collector membrane is generally equipped with the analyte detection system. Thus, when a moiety to be tested is present or not present in the plasma, the presence or absence can be registered on the collector membrane. The devices of the Koehen et al. and the Kiser et al. patents are generally referred to as "vertical wicking devices," since the tested material passes vertically through the membrane. Speed of liquid passage through the membrane is the operative test of efficiency in such devices, as is the completeness of the separation of liquid from solid particulate materials. Certain other considerations are also important measures of efficiency, such as limited interference of the solid material with the liquid, and, in blood separation applications, the limited lysis of cells.

Another type of testing device design is a "lateral wicking device." In such a device, a backing material provides a support for a separation membrane and a contact membrane. The contact membrane is equipped with chemical reactants or other detection indicators, to allow detection of the presence or absence of the agent being tested. The separation membrane filters out undesired components in the liquid, such as, for example, cells from blood. The separation membrane and the contact membrane are in contact at an interface. Thus, in operation, the liquid that contains solid materials is contacted with the separation membrane, and the fluid wicks toward the interface. After wicking, laterally or horizontally, through the separation membrane and reaching the interface, the fluid enters the contact membrane where it reacts with the detection indicators that are provided in the contact membrane. Such reaction can be detected by a variety of standard techniques that are well known in the art.

As will be appreciated, the operative test for determining the efficiency of testing devices is the rate of wicking of the appropriate liquid through the membrane as well as the completeness of separation of the liquid from any solids. Thus, in blood separation contexts, the speed of plasma passage laterally through the membrane is the operative test of efficiency in such devices, as is the completeness of the separation of plasma and limited lysis of cells.

The membranes of the invention are particularly efficient in use as separation membranes in lateral wicking devices. When a solid-containing liquid is applied to the coarse pored surface of the membrane at one end of a narrow strip of this membrane, it wicks through to the microporous surface and toward the other end of the strip. The relatively large particles in the sample are restrained, while the liquid continues to flow. In a device, the liquid permeates the strip and reaches a second membrane, often of nitrocellulose, which contains a testing reagent such as, for example, an enzyme or an antigen- or antibody-linked reagent.

Fast wicking is important. The higher the membrane surface porosity, the faster the plasma transfer rate. Simply providing a high degree of asymmetry does not necessarily translate into an enhanced wicking rate. A low degree of surface porosity, even with a high degree of asymmetry, appears to cause blocking or clogging of the solid-containing liquid, with consequent slower separation than is possible through use of the membranes of the present invention.

The current membranes contain high concentrations of polyvinylpyrrolidone (PVP), which makes the membranes hydrophilic and also influences the pore size and structure. Moreover, because the PVP is included in the formulation, there is no need for a second treatment with hydroxypropylcellulose to make the membrane hydrophilic.

The driving force for fast wicking is the hydrophilicity of the PVP in combination with the pore structure, whereby liquid is drawn into the membrane by capillary forces and solids are retained in the more open support. PVP also increases the dope viscosity and slows down the solvent/non-solvent exchange rate. The quench bath temperature also plays an important role in that a higher temperature bath creates a more asymmetric structure and a larger mean flow pore size than does a lower temperature bath.

Lateral wicking speed depends on whether the wicking is radial or linear, and on the volume of the fluid applied to the wicking membrane. It is possible to standardize wicking speed measurements for different membranes by using a nonlimiting amount of the same fluid in all tests, and by using membrane strips of identical proportions. Lateral wicking speeds reported herein are determined using a membrane strip 1 cm wide by 3 cm long. A narrow edge (1 cm) of the membrane is contacted with a relatively large volume of water, and the rate of migration of the water front in the membrane strip is measured. The wicking rates thus measured are expressed in millimeters per second. Membranes of the present invention have lateral wicking speeds in excess of 5 mm/second.

Examples Relating to Membrane Manufacture

The following examples relate to the manufacture of particular microporous membranes in accordance with the present invention. Such examples are meant to be illustrative of the various casting conditions that can be utilized to manufacture membranes in accordance with the invention and to provide guidance as to the manners in which conditions can be modified to achieve particular properties in the resulting membranes. As such, the following examples are illustrative and not limiting.

EXAMPLE 1

A homogeneous casting solution was prepared using 9.3% polysulfone polymer (Udel 3500), 19% polyethylene glycol (MW 200), 4.3% polyvinylpyrrolidone, 1.8% water, and 65.6% N-methyl pyrrolidone. The casting solution was maintained at room temperature, approximately 25° C. The casting surface was a moving belt of polyethylene coated paper, and the knife gap was 24 mils. Following casting, the dope was exposed to humid air (65–70% relative humidity) for 6 seconds prior to quenching in a water bath having a temperature of between about 40 and 45° C.

Following quenching, the membrane was removed, washed with deionized water and oven dried at about 100° C. Thereafter, the membrane was tested for water flow and mean flow pore size. Water flow was measured through membrane in a standard 47 mm disc holder at 10 psid and mean flow pore size was measured using a Coulter porometer. The membrane is shown in FIG. 1, and possessed the following characteristics:

TABLE III

| Water Flow (ml/min/9.5 cm$^2$ @ 10 psid) | Mean Flow Pore Size |
| --- | --- |
| 2000 | 1.5 µm |

EXAMPLE 2

A homogeneous casting solution was prepared using 9.3% polysulfone polymer (Udel 3500), 19% polyethylene glycol (MW 200), 4.3% polyvinylpyrrolidone, 1.8% water, and 65.6% N-methyl pyrrolidone. The casting solution was maintained at room temperature, approximately 25° C. The casting surface was a moving belt of polyethylene coated paper, and the knife gap was 19 mils. Following casting, the dope was exposed to humid air (65–70% relative humidity) for 9 seconds prior to quenching in a water bath having a temperature of between about 40 and 45° C.

Following quenching, the membrane was removed, washed with deionized water and oven dried at 100° C. Thereafter, the membrane was tested for water flow and mean flow pore size. Water flow was measured through membrane in a standard 47 mm disc holder at 10 psid and mean flow pore size was measured using a Coulter porometer. The membrane is shown in FIG. 2, and possessed the following characteristics:

TABLE IV

| Water Flow (ml/min/9.5 cm$^2$ @ 10 psid | Mean Flow Pore Size |
| --- | --- |
| 8000 | 5 µm |

EXAMPLES 3–6

Effects of Exposure Time and Humidity

The method of Example 1 is repeated, except that the exposure time or relative humidity is varied as shown in Table V. The effect of the variation on the membrane produced is indicated.

TABLE V

| Example | Exposure Time | Humidity | Effect |
| --- | --- | --- | --- |
| 3 | 3 sec | 65–70% | tighter skin pores smaller mean flow pore size |
| 4 | 20 sec | 65–70% | more open skin pores less asymmetry |
| 5 | 6 sec | 50% | tighter skin pores smaller mean flow pore size |
| 6 | 6 sec | 90% | more open skin pores less asymmetry |

EXAMPLES 7–10

Effects of Casting Temperature and Quench Temperature

The method of Example 1 is repeated, except that the knife gap or quench temperature is varied as shown in Table VI. The effect of the variation on the membrane produced is indicated.

TABLE VI

| Example | Knife Gap | Quench T | Effect |
|---------|-----------|----------|--------|
| 7 | 15 mils | 40–45° C. | thinner membrane larger pore size |
| 8 | 50 mils | 40–45° C. | thicker membrane smaller pore size |
| 9 | 24 mils | 20° C. | tighter skin pores more asymmetry |
| 10 | 24 mils | 70° C. | more open skin pores less asymmetry |

Equivalents

The present invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A blood separation device, the device comprising an asymmetric integral sulfone polymer membrane, the asymmetric membrane rendered hydrophilic through co-casting a sulfone polymer with a hydrophilic polymer, the asymmetric membrane comprising a first microporous skin surface, a porous support, and a second coarse pored surface, the microporous skin surface possessing skin pores, the skin pores having an average diameter of from about 0.1 micron to about 10 microns, the porous support comprising an asymmetric region of gradually increasing pore sizes, wherein pores on the second coarse pored surface have an average diameter of about 5 times to about 1000 times the diameter of the skin pores, wherein the device is capable of separating a first component of blood from a second component of blood based on a size difference between the first component and the second component.

2. The blood cell separation device of claim 1, wherein the first component comprises plasma and the second component comprises blood cells.

3. The blood cell separation device of claim 1, wherein the first component comprises blood platelets and the second component comprises large blood cells.

4. The blood cell separation device of claim 3, wherein the large blood cells are selected from the group consisting of leukocytes, lymphocytes, platelets, neutrophils, B-cells, T-cells, monocytes, macrophages, and mixtures thereof.

5. The blood cell separation device of claim 1, wherein a surface of the asymmetric membrane is charge-modified.

6. The blood cell separation device of claim 1, wherein the blood separation device comprises a vertical wicking device.

7. The blood cell separation device of claim 6, further comprising a collector membrane, wherein the microporous skin surface of the asymmetric membrane is in intimate contact with the collector membrane.

8. The blood cell separation device of claim 7, wherein the collector membrane comprises an analyte detection system.

9. The blood cell separation device of claim 1, wherein the blood separation device comprises a lateral wicking device.

10. The blood cell separation device of claim 9, wherein the blood separation device further comprises a contact membrane, wherein the contact membrane and the asymmetric membrane are in contact at an interface.

11. The blood cell separation device of claim 10, wherein the contact membrane comprises a detection indicator capable of detecting a presence or absence of an agent being detected.

12. The blood cell separation device of claim 11, wherein the detection indicator comprises a chemical reactant.

13. The blood cell separation device of claim 11, wherein the detection indicator is selected from the group consisting of an enzyme, an antigen-linked reagent, and an antibody-linked reagent.

14. The blood cell separation device of claim 10, wherein the contact membrane comprises a nitrocellulose membrane.

15. The blood cell separation device of claim 9, wherein the asymmetric membrane possesses a lateral wicking speed of water of at least about 5 mm/second.

16. The blood cell separation device of claim 1, wherein the asymmetric membrane has a bulk void porosity of about 80 percent or more.

17. The blood cell separation device of claim 1, wherein the asymmetric membrane comprises a mean flow pore size of from about 0.1 µm to about 10 µm.

18. The blood cell separation device of claim 1, wherein the asymmetric membrane possesses a density of skin pores of at least about 15 pores per 1000 µm$^2$.

19. The blood cell separation device of claim 1, wherein the asymmetric membrane has a thickness of from 100 microns to 340 microns.

20. The blood cell separation device of claim 1, wherein the sulfone polymer is selected from the group consisting of polysulfone, polyethersulfone, and polyarylsulfone.

21. The blood cell separation device of claim 1, wherein the hydrophilic polymer comprises polyvinylpyrrolidone.

22. A method for separating large blood cells from red blood cells based on a size difference between the large blood cells and the red blood cells, the method comprising:

providing a blood separation device, the device comprising an asymmetric integral sulfone polymer membrane, rendered hydrophilic through co-casting a sulfone polymer with a hydrophilic polymer, the asymmetric membrane comprising a first microporous skin surface, a porous support, and a second coarse pored surface, the microporous skin surface possessing skin pores, the skin pores having an average diameter of from about 0.1 micron to about 10 microns, the porous support comprising an asymmetric region of gradually increasing pore sizes, wherein pores on the second coarse pored surface have an average diameter of about 5 times to about 1000 times the diameter of the skin pores, and the device further comprising a collector membrane, wherein the collector membrane contacts the first microporous skin surface of the asymmetric membrane; and contacting a blood sample with the second coarse pored surface, whereby a first component of the blood sample passes through the asymmetric membrane, and whereby a second component of the blood sample is filtered out in pores of the asymmetric membrane, the first component of the blood sample having a smaller size than the second component.

23. The method of claim 22, wherein the blood separation device comprises a lateral wicking device, wherein the device further comprises a contact membrane in contact with the microporous skin surface of the asymmetric membrane, and wherein the contact membrane comprises a detection indicator, the method further comprising the step of:

contacting the first component with the contact membrane, such that the detection indicator detects a presence or an absence of an agent in the first component.

24. The method of claim 22, wherein the blood separation device comprises a vertical wicking device, wherein the device further comprises a collector membrane in intimate contact with the microporous skin surface of the asymmetric membrane, and wherein the collector membrane comprises an analyte detection system, the method further comprising the step of:

collecting the first component in the collector membrane, such that the analyte detection system detects a presence or an absence of an analyte in the first component.

* * * * *